C. U. McLAIN.
VARIABLE VALVE GEAR.
APPLICATION FILED JULY 11, 1916.
1,226,549.
Patented May 15, 1917.
2 SHEETS—SHEET 1.
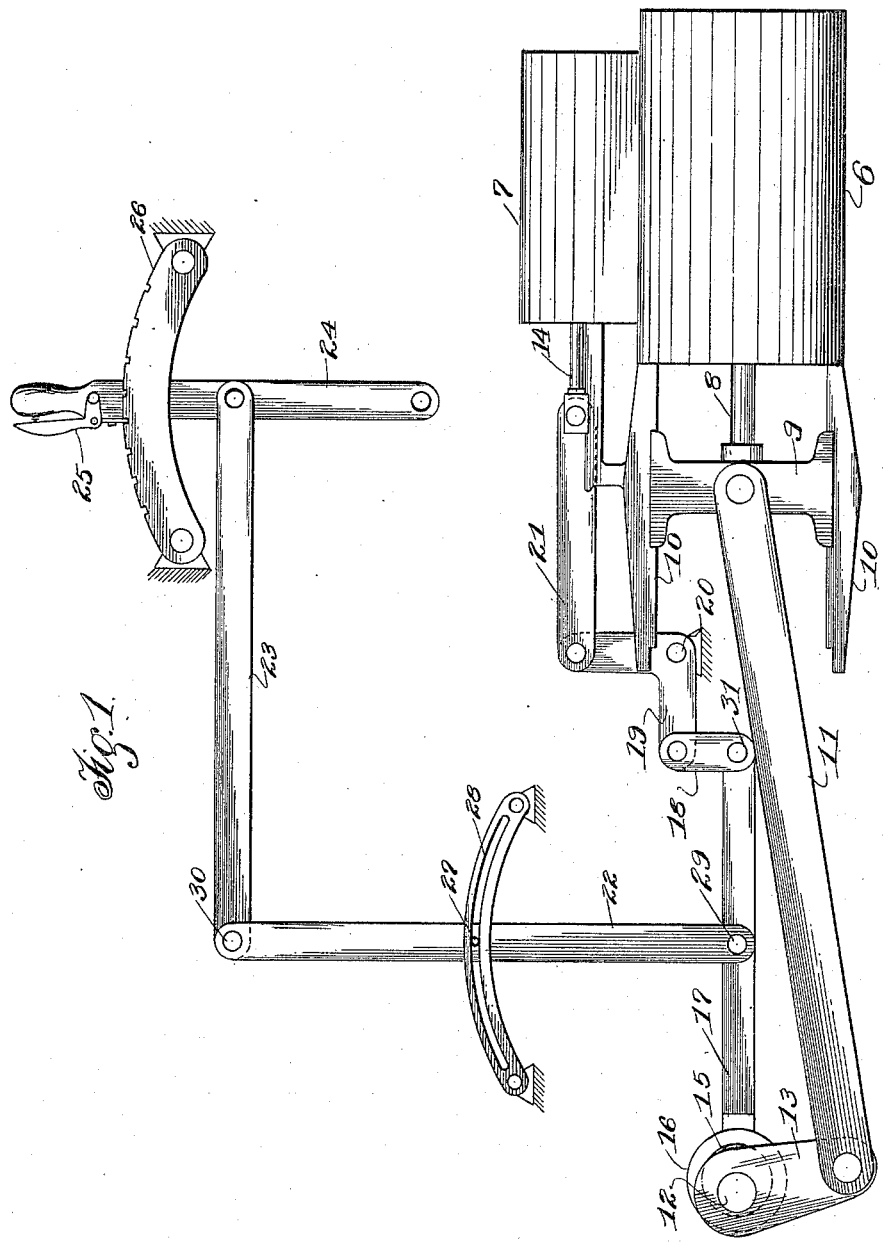
Inventor
Charles U. McLain.
by
Edmund A. Strauss
Atty.

C. U. McLAIN.
VARIABLE VALVE GEAR.
APPLICATION FILED JULY 11, 1916.
1,226,549.
Patented May 15, 1917.
2 SHEETS—SHEET 2.
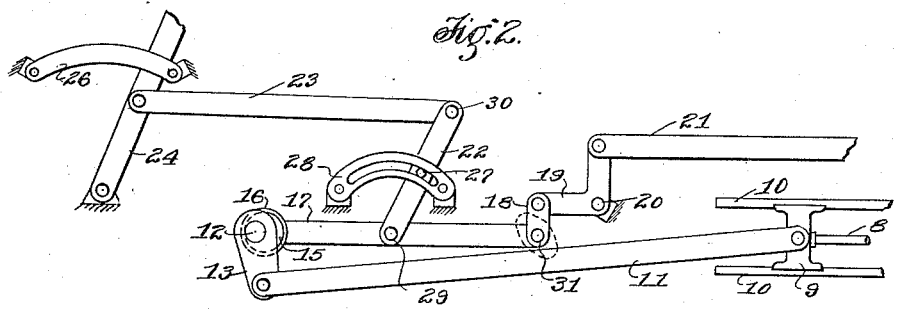
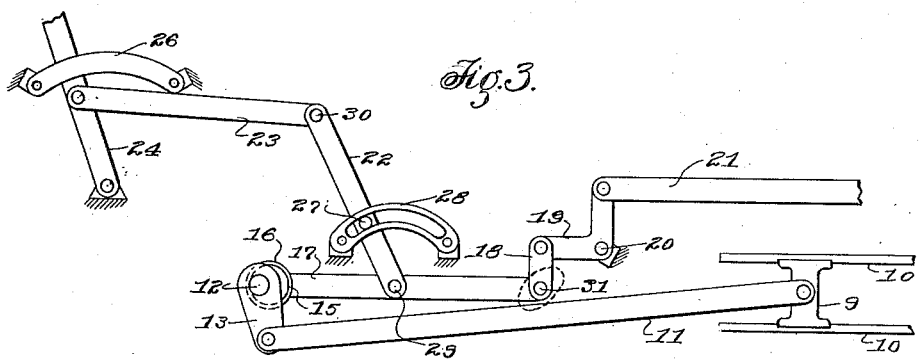
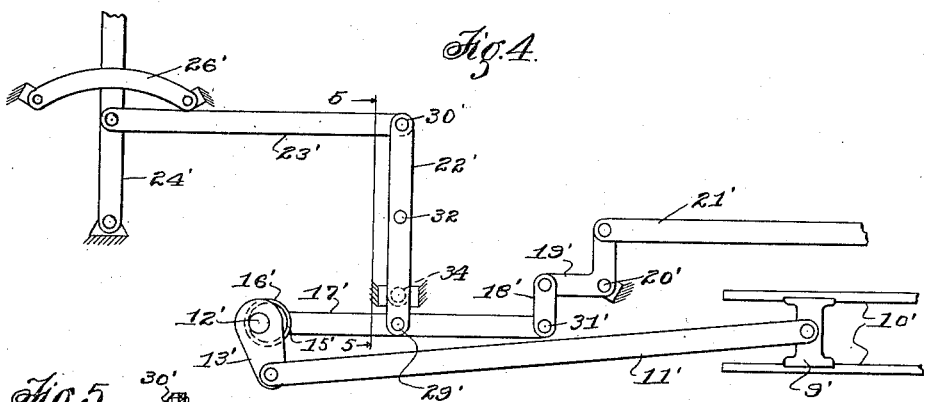
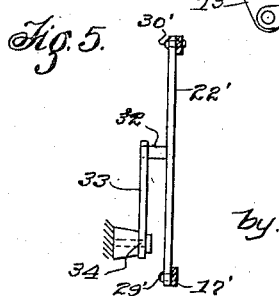
Inventor.
Charles U. McLain.
by Edmund A. Strauss
Atty.

UNITED STATES PATENT OFFICE.

CHARLES U. McLAIN, OF EAST BAKERSFIELD, CALIFORNIA.

VARIABLE VALVE-GEAR.

1,226,549.　　　Specification of Letters Patent.　　Patented May 15, 1917.

Application filed July 11, 1916.　Serial No. 108,572.

*To all whom it may concern:*

Be it known that I, CHARLES U. MCLAIN, a citizen of the United States, residing at East Bakersfield, in the county of Kern and State of California, have invented new and useful Improvements in Variable Valve-Gears, of which the following is a specification.

This invention relates to a variable valve gear, and pertains especially to a valve gear for use with reciprocating steam engines.

It is an object of this invention to provide a variable cut-off valve gear which will produce a rapid motion at the beginning of the valve stroke.

It is a further object of this invention to provide a valve gear construction in which the valve travel adjusting means is independent of any connection with the crosshead or connecting rod of the engine.

In addition to the above objects it is a still further object to provide a valve gear construction by which compactness and simplicity of structure, efficiency of operation and ease of manipulation are secured.

I accomplish these objects by means of the embodiment of my invention illustrated in the accompanying drawing, in which:

Figure 1 is a diagrammatic view of my valve gear applied to an engine with the gear in neutral position.

Fig. 2 is a diagrammatic view of the valve gear set full gear forward.

Fig. 3 is a similar view with the valve gear set full gear reverse.

Fig. 4 is a modified form of valve gear and a form in which I prefer to embody my invention.

Fig. 5 is a section as seen on the line 5—5 of Fig. 4.

Referring more particularly to Figs. 1, 2, and 3, an engine cylinder 6 has mounted thereon a valve chest 7 in which is disposed a slide valve of the usual form. The engine piston rod 8 has secured to it a cross head 9 which travels in guides 10. Secured to the cross head 9 is a connecting rod 11. The engine shaft 12 is provided with a crank arm 13 to which is secured the connecting rod. The valve is provided with a valve rod 14. The engine structure just described is representative of a type of engine to which my valve gear may be applied.

Mounted upon the engine shaft 12 is an eccentric 15. A collar 16 is mounted upon the eccentric and is secured to a reciprocating rod 17. A crank may be employed instead of an eccentric or any means of converting rotary into reciprocating motion. The end of the reciprocating rod 17 is connected by a link 18 to one arm of a bell crank lever 19 which is pivoted at 20 to a stationary part of the engine. The other arm is connected by a link 21 to the valve rod 14.

Pivotally secured to the reciprocating rod 17 intermediate its ends is a fulcrum rod 22. The upper end of the fulcrum rod 22 is pivotally connected to one end of a reach rod which is secured to a reversing lever 24 provided with a catch 25 which engages a quadrant 26. Secured to the fulcrum rod 22 is a link pin 27 which is disposed in a guide slot of a stationary link 28. The guide slot is of arcuate form with its concave side turned toward the reciprocating rod 17.

Referring particularly to Fig. 1, the eccentric is shown in advance of the engine crank and may be set to give the desired valve periods. As the eccentric reciprocates it rocks about the pivotal connection 29 as a fulcrum. The fulcrum is also moved through a curved path which is a combination of the motion due to the link pin 27 moving through an arc with its concave side toward the reciprocating rod and an arc due to the fulcrum rod pivoting about the point 30. The rod 17 in addition to its reciprocating movement rocks upon pivot 29, the latter having a component of movement vertically. The vertical component of movement of pivot 29 increases the major axis of the curve described by the end of rod 17. The movement of pin 27 in the guide 28 is relatively small. The resultant path of movement of the end 31 of the reciprocating rod is an oblate path with its major axis vertical and the motion transmitted through the bell crank lever 19 and link 21 to valve rod 14 is so small that the engine ports will not be uncovered.

Upon moving the reversing lever to the right as shown in Fig. 2, the reach rod 23 is moved to the right carrying with it the pivot pin 30 about which fulcrum rod 22 rocks. The resultant effect is to cause the fulcrum point 29 of reciprocating rod 17 to move through a path slightly different from that shown in Fig. 1, increase the vertical component of movement of fulcrum point 29 and to incline the oblate path of pivot point 31 as shown in the dotted lines thereby increasing the valve travel, and giving a maximum cut-off.

As the radius vector of the oblate path is of uniform angular velocity, the linear velocity at the flattened poles is less than at the other. This results in a rapid motion at the beginning of the valve stroke.

To reverse the engine, reverse rod 24 is moved to the left carrying with it reach rod 23 and the pivot point 30 changing the path of travel of the pivot pin 31 so that the oblate is inclined in an opposite direction to that shown in Fig. 2, thereby reversing the valve travel and reversing the engine.

In Fig 4 a preferred form of construction is shown. Parts of the engine and valve gear corresponding to those shown in Figs. 2 and 3 are indicated by similar numbers with a prime (') added. The reach rod 23' is pivotally connected to the fulcrum rod 22' as before. A pin 32 corresponding to the link 27 shown in Figs. 1, 2 and 3, is disposed upon the fulcrum rod intermediate its ends, and pivotally mounted thereon is a rock link 33 which rocks about a stationary pivot point 34, thereby guiding the pin 32 through an arc with its concave side toward the reciprocating rod 17' so that the same relative motions are secured as in Figs. 1, 2 and 3, but with this difference that in the preferred construction there is less wear, as there is no link pin slipping in a guide link. In order to effectively operate the valves, the fulcrum point 34 must be above the pivot point 29' on the reciprocating rod, this is to produce the differential cut-off.

What I claim is:

1. A valve gear, comprising in combination a reciprocating rod, a reach rod, a fulcrum rod pivotally secured adjacent one end to said reciprocating rod intermediate the ends of the latter and adjacent the other end thereof to said reach rod, means to guide said fulcrum rod intermediate its ends through an arc having its concave side turned toward said reciprocating rod.

2. A valve gear, comprising in combination a reciprocating rod, a reach rod, a fulcrum rod pivotally secured adjacent one end to said reciprocating rod and adjacent the other end thereof to said reach rod, a rock lever pivoted at a stationary point at one end and at the other end to said fulcrum rod intermediate the ends of the latter.

3. A valve gear, comprising in combination a reciprocating rod, a reach rod, a fulcrum rod pivotally secured adjacent one end to said reciprocating rod and adjacent the other end thereof to said reach rod, a rock lever pivoted at a stationary point at one end and at the other end to said fulcrum rod intermediate the ends of the latter, a valve rod, and means securing said valve rod to said reciprocating rod.

In witness that I claim the foregoing I have hereunto subscribed my name this 14th day of June, 1916.

CHARLES U. McLAIN.

Copies of this patent may be obtained for five cents each, by addressing the "Commissioner of Patents, Washington, D. C."